(12) United States Patent
Baker et al.

(10) Patent No.: US 6,540,562 B1
(45) Date of Patent: Apr. 1, 2003

(54) PANEL SYSTEM FOR COMMUNICATION JACKS

(75) Inventors: Daniel L. Baker; John E. Grant, both of Cambridge (CA)

(73) Assignee: AVP Mfg. & Supply Inc., Cambridge (CA)

( * ) Notice: Subject to any disclaimer, the term of this patent is extended or adjusted under 35 U.S.C. 154(b) by 0 days.

(21) Appl. No.: 09/501,578

(22) Filed: Feb. 10, 2000

(51) Int. Cl.[7] .............................................. H01R 24/04
(52) U.S. Cl. ..................................................... 439/668
(58) Field of Search ......................... 439/61, 668, 669, 439/79, 55, 76, 80, 607, 76.1, 676, 493, 77; 379/316, 317; 361/413, 415

(56) References Cited

U.S. PATENT DOCUMENTS

| | | | |
|---|---|---|---|
| 688,673 A | * | 12/1901 | North ......................... 439/668 |
| 3,692,966 A | | 9/1972 | Lancaster |
| 4,770,639 A | * | 9/1988 | Lau ............................. 439/61 |
| 4,797,114 A | | 1/1989 | Lau |
| 4,861,281 A | * | 8/1989 | Warner ....................... 439/540 |
| 4,874,317 A | | 10/1989 | Lau |
| 4,878,847 A | | 11/1989 | Rutledge |
| 5,039,824 A | | 8/1991 | Takashima et al. |
| 5,269,708 A | | 12/1993 | DeYoung et al. |
| 5,439,395 A | * | 8/1995 | Laukzemis .................. 439/668 |
| 5,938,478 A | * | 8/1999 | Wernwe ...................... 439/188 |
| 6,038,766 A | * | 3/2000 | Werner ........................ 439/668 |

* cited by examiner

Primary Examiner—Khiem Nguyen
Assistant Examiner—J. F. Duverne
(74) Attorney, Agent, or Firm—R. Craig Armstrong (57) ABSTRACT

A communication jackfield having a face-plate, with a multitude of first through holes. Further, a multitude of assemblies comprising two or more communication jacks, having wire-wrap terminal connectors, are arranged to be mounted in the first through holes of the face-plate. A printed circuit board is fastened to the terminal connectors and is arranged in a gap formed between the terminal connectors. The board has an electrically conducting pattern arranged on both flat sides of the board, the pattern comprising a set of input pads, electrically connectable to the terminal conductors, a set of output pads, for connecting to electrical wiring, and interconnecting means for electrically connecting an individual input pad to an individual output pad.

14 Claims, 9 Drawing Sheets

FIG.1 PRIORART

FIG.2 PRIORART

FIG.3 PRIORART

FIG.4 PRIORART

PANEL SYSTEM FOR COMMUNICATION JACKS

BACKGROUND OF THE INVENTION

1. Field of the invention

The invention relates to a panel system for communication jacks, also known as jackfields. A jack, as the term is used hereafter, is an individual female contact, for mechanical and electric cooperation with a corresponding male jack plug.

2. Description of the Prior Art

A jack-field is an array of jacks used to cross-patch audio, video or digital signals. The jackfield also serves as a test or monitoring point for these same signals. Jackfields are used where considerable quantities of audio, digital or video signals need to be interconnected in varying configurations. The primary industries are telecommunications, broadcast, cable, duplicating and recording.

The jackfield usually has a generally flat face plate with a plurality of holes, one hole for each jack. The signals coming to and exiting the jackfield are interfaced at the rear of the jackfield. The communication jacks accept standard jack plug patch cords, to effect the desired interconnection, or patch, between two jacks at the front of the panel system. The jackfields are usually rack-mounted. Other names used to describe jackfields are patch-field, patch-bay, bay, audio bay or video bay.

The jacks are available in different types such as video, digital video, longframe audio and bantam audio. The invention is directed primarily to longframe audio and bantam audio jacks.

Longframe and bantam (a.k.a. TT) audio jacks are the most traditional of the types of jacks used in jackfields. They are used mainly for audio, digital audio and RS422 signal patching. These jacks have a very specific range of function and design. The functions of the two are the same with the difference only in their physical size. The longframe is the larger of the two, and is the jack that was used in the early telephone switchboards. Bantam jacks are used extensively in modern applications because they conserve space. Bantam jacks have been available for 30+years. The telecommunications industry has used them for many years with the broadcast industry accepting them in large quantities only over the past 10 years. Large quantities of the longframe jacks are still used and generally remain the preferred jack if space is not an issue. The jacks are available in different circuit configurations, with different switching capabilities, but all with very distinct and unified physical design making these jacks a very unique product "family". All the jack models are the result of military design and mate with one basic patchcord plug style, again with size being the only real difference between bantam and longframe. Bantam jacks are sometimes referred to as "TT" or "tiny telephone" jacks. They are one and the same.

The jacks are available with rear terminals that accept wire-wrap connection or with terminals designed for soldering.

A pre-wired jackfield is an array of jacks that are wired to some type of other interface. Most users of jackfields do not want to wirewrap or solder directly to the bantam or longframe jacks. They will specify the type of interface/connection they would prefer. Because the jacks themselves cannot economically or practically be directly fitted with other types of interfaces, manufacturers solder or wire-wrap wires to the jacks and attach these wires to the type of interface the customer has requested. Thus, the term pre-wired jackfield. The purpose is to save the customer installation time and enhance functionality and serviceability of the jackfield. The pre-wired jackfield has been a high demand product for the past 30 years. Many manufacturers have developed standard interfaces that include punch terminals, multipin connectors, more accessible wirewrap and solder pins, screw terminals and more.

Normals are circuits that connect two jacks without the use of a patchcord. The telephone operators switchboard did not need these circuits because there were no connections that would"normally" be interfaced as a default. Someone would get a very large telephone bill. The operator had to use a patchcord for every desired connection. But in the current day applications where these jacks can exist in one location in thousands, using patchcords in the front of the rack for every required patch would be virtually impossible. Therefore, the system designers will put an input and output jack vertically adjacent to each other. The jacks are connected at the rear to each other via some extra interface terminals provided on the jack (solder or wirewrap). The jackfield manufacturer wires jumpers between these extra terminals. The signal coming to one jack is now connected to the other jack as the default, or "normal" configuration without the use of a patchcord. These extra interface terminals on the back of the jack are connected to switching contacts in the jack. When a patchcord is inserted into either of these jacks from the front, the switching contacts in the jack break, thus the "normal" signal path is broken. The signal now goes through the patchcord for patching to a new location. There are two types of "normalling", "full normalling" and "half normalling". Full normalling is described above where the normal signal path is broken if a patchcord is inserted into either of the vertically adjacent jacks. Half normalling is a variation, where the signal path is broken if a patchcord is inserted into the bottom jack of the two vertically adjacent jacks, but it is not broken if a patchcord is inserted into the top jack. This allows the signal to be monitored without interupting the signal path. Real-time testing of television broadcast signals can be accomplished this way, for example.

The audio industry in general has many different philosophies regarding grounding of audio systems. Jackfields must thus accommodate different preferences for grounding methods. Each jack has a ground connection and in a jackfield there are many jacks. Some designs require the grounds for each jack to be kept separate, while other designs require all the jacks to have a common ground. Another method is to have all the input grounds common and all the output grounds common. Still another is to have the vertically adjacent pairs of jacks common in terms of grounding, but isolated from the other pairs.

Wiring jacks out to some other type of interface is very time consuming, and this labor forms a considerable part of the cost in this type of product. As an alternative to using wire in pre-wired jackfields, jackfields have been designed using printed circuit boards (PCBs) that connect the jacks to the desired rear interface. There are, however, limitations that make this method, as it is known, useful only for certain applications.

The following describes possible prior art for printed circuit board jackfields using traditional longframe and bantam audio jacks.

1. Jacks with solder terminal rear interface.

No known prior art, solder terminals are an awkward shape for inserting into a printed circuit board.

2. Jacks with wirewrap rear interface.

2A. The small diameter square terminals used for wirewrap are suitable for inserting into a PCB (printed circuit board) even though this was never intended. This procedure has been followed by various companies with limited success for many years. The configuration is to have one mass PCB with mounting holes to insert the rear jack terminals into, thus creating one board with up to 96 jacks soldered to it. The jacks must then all be screwed into a rack mount panel. The printed circuit board must also house a PCB mountable version of a desired interface of some kind, since an easier interface for the customer is the main point. Because the wirewrap terminals are in-line with the jack, the PCB plane is at 90 degrees to the jack, i.e. perpendicular to the longitudinal axis of the jack. A variation on this could be to have an individual PCB for each jack. Individual boards at 90 degrees to the jack is not positively known to have been tried. There are physical limitations that would make this difficult (space between jacks mounted in the jack-field).

2B. To overcome limitations of method 2A, a jack was introduced with the rear terminals bent 90 degrees. Now the jacks could be mounted into a mass PCB that is horizontal and inline. This created other serious physical limitations. One PCB is required for each row of jacks.

2C. The jack in 2B could also be mounted into a single horizontal and inline PCB, but still with limitations.

2D. The jack in 2B could also be mounted into a single vertical and inline PCB, but still with certain limitations.

The specific limitations for the methods of jack mounting in 2A to 2D inclusive, in respect to making them into a jackfield vary for the longframe and the bantam, each will be dealt with separately. The limitations for the methods of jack mounting will be described in terms of a. density
b. structural integrity
c. serviceability
d. assembly
e. labor content
f. normalling options
g. grounding options

BANTAM

The standards for jack density that are common to jackfields with bantam jacks are: Jackfields must provide a maximum density of 108 jacks in one rackspace. One rackspace is 1.75"(44.45 mm) in height and standard rack width is 19" (482.6 mm). Telecommunications industry also use 23" (584.2 mm) wide racks, but then jackfields are mounted using filler panels.

The density requirement, as stated above, requires the jacks to be mounted down to 0.312" (7.23 mm) horizontal centers. Bantam jackfields have the jacks configured in maximum density of 2 rows of 54 jacks in one rack space. By far the most common bantam jackfield configuration is 96 jacks (2 rows of 48) in one rack space by 19" (482.6 mm) wide. This constitutes probably 90% of the use, or more. The industry standard jack spacing is alternating horizontal centers of 0.312"/0.370" (7.23/9.40 mm). This puts the jacks in visual pairs and is the expected layout for this product and also constitutes around 90% of the actual use today.

Method 2A, mass PCB at 90 degrees to the jacks:

a. Density

It is physically possible to mount 2 rows of 48 jacks in this PCB, in one rack space. The problem is that because the jack mounting holes occupy most of the PCB surface, there is no room to mount a preferred customer interface to the PCB. So this type of jackfield effectively requires a two-rack space configuration (3.50"(88.9 mm) high) to make room for interface options. This does not meet the requirement.

b. Structural Integrity

For some types of rear interface, this is a sound alternative. But for a rear interface that utilizes punch terminals, it creates a problem. Connections are made to punch terminals with the use of an impact tool. The tool creates a sudden and forceful impact as it strikes a wire into a terminal. The terminal housing is soldered into the PCB and the jack terminals are soldered into the PCB. Damage can occur to these joints mechanically from repeated striking. The terminals are rated for multiple uses, up to 300 times in some cases. With this design, the components are soldered to the board only at the precise points of contact. A few strikes with an impact tool will start to lift the conductive foil from the PCB. This does not meet the requirement.

c. Serviceability

Because the jacks are soldered into one PCB, and then all the jacks are screwed into a single piece front jackfield panel, jack replacement is virtually impossible. The jackfield would have to be fully removed from service (quite often this alone is not possible). This means all the customer installed interface cables would have to be removed from the rear of the jackfield. Then the jackfield would be removed from the rack. Next the 96 jack screws would have to be removed, then the defective jack would be de-soldered and replaced, and finally 96 screws re-assembled, the jackfield would be put back in the rack and the desired jackfield connections re-installed. Industry standards say this is an unacceptable level of serviceability. This is why this type of PCB jackfield is virtually unheard of.

d. Assembly

From a production point of view this is a nightmare. Soldering in confined spaces and trying to align the parts is virtually impossible. There are two choices: first you could insert all the jacks into the PCB and solder 5 points per jack, then you have to get all 96 jacks into 96 holes in a front panel at the same time. Putting the jacks into the front panel first is the second choice, but then you are faced with 480 terminals to insert into one PCB at once. This is basically impossible.

e. Labor Content

Obviously, this is a very labor intensive product, and would take more time than hardwiring it the more traditional way.

f. Normalling Options

Normalling options are always"Full normals""Half normals" or"No normals". You could pre-normal each vertical pair of jacks with wire jumpers and then insert the pair of jacks into the PCB (no wire jumpers for"no normals"). You would have three different models of assemblies. Some customers like to have access to the normal jumpers so they can customize each vertical pair for normalling option. No customer access is possible for this type of jackfield. The other possibility is to try and connect the two jacks on the PCB. To cover the 3 options, 3 different boards would be required. This is a step backward from traditional normalling practices.

g. Grounding Options

A dedicated grounding option must be chosen for each product offered.

Method 2B. 2 mass PCB's in-line, iacks with bent rear terminals:

a. Density

It is not known if this configuration has been successfully tried in one rack space. It has probably not been accomplished.

b. Structural Integrity
Same problems as in 2A.
c. Serviceability
Not serviceable (see reasoning in 2A).
d. Assembly
Same assembly problems as in 2A.
e. Labor Content
No labor content improvement over 2A.
f. Normalling Options
Traditional normalling options would be impossible to accomplish. The jacks are first soldered to the boards. The vertical jack pairs are on separate boards. Jumpers could go from board to board, but this is not practical, and has probably never been done with this type of jack.
g. Grounding Options
A dedicated grounding option must be chosen for each product offered.
Method 2C. one horizontal PCB per jack, in-line, jacks with bent rear terminals:
a. Density
It is not known if this configuration has been successfully tried in one rack space. It is has probably not been accomplished, because it is impractical.
b. Structural Integrity
Each PCB would have little strength without a surrounding frame of some sort. On its own it would be a poor alternative for most applications.
c. Serviceability
Good serviceability.
d. Assembly
Better assembly than 2A and 2B.
e. Labor Content
Somewhat improved compared to 2A and 2B.
f. Normalling Options
Traditional normalling options are available.
g. Grounding Options
A dedicated grounding option must be chosen for each product offered.
Method 2D. one vertical PCB per vertical jack pair, in-line, jacks with bent rear terminals:
a. Density
Providing a pace plate having 0.312" (7.93 mm) centers for bantam jackfields is not possible. The jack is 0.280" (7.11 mm) wide. With a PCB of the required structural strength, we would surpass 0.312" width for a single module, even without considering other clearance issues.
b. Structural Integrity
None.
c. Serviceability
Good serviceability.
d. Assembly
Good assembly.
e. Labor Content
Improved over 2A, 2B and 2C.
f. Normalling Options
Can be accomplished with PCB circuits or jumper connections.
g. Grounding Options
A dedicated grounding option must be chosen for each product offered.
LONGFRAME
Standards for density that are common to jackfields with longframe jacks: Jackfields must provide a maximum density of 56 jacks in one rackspace. Rackspace is as described above. The density requirement thus stipulates that the jacks will have to be mounted down to 0.625" (15.88 mm) center-to center. Longframe jackfields have the jacks configured in maximum density of 2 rows of 28 jacks in one rack space. There is no one configuration that totally dominates the market as there is for the bantam jacks. The industry standard jack spacing is horizontal center-to-center distances of 0.625" (15.88 mm), and is rarely different. With space always at an ever increasing premium, the market continually shifts to maximum density versions.

The traditional method of providing a jackfield is to mount individual jacks, see FIGS. 1 to 4 for an example of a jack, into holes arranged on a faceplate. A jack has a plurality of outputs, each output being connected to either signal or ground as desired when a plug is inserted or not inserted into the jack. A different combination of outputs are thus possible for a single jack, one for when no plug is inserted and one when a plug is inserted. Each jack has to be screwed, or otherwise fastened, onto the faceplate from the rear of the faceplate. A standard configuration is to mount the jacks in vertical pairs, possibly grouped with other pairs to form larger sub-fields within the jackfield. After all jacks have been mounted in the faceplate, they are connected to different signal sources or signal outputs, either by soldering, wire-wrapping, punch termination or by screwing the electric leads to screw terminals.

Typical installation of these jacks from inception to present day sees these jacks mounted into panels, the panels mounted into equipment racks. The wireman/installer solders or wire-wraps signals to the rear of the jacks, and thus signal paths can be cross-patched with the use of a patchcord at the front of the equipment rack. Because of the difficulty involved in wiring directly to these jacks inside an equipment rack (a rack can be up to 30" deep), it became common to attach wires to a panel full of jacks on a workbench, and attach the other end of the wires to a 2-sided interconnect device. This complete unit was then placed in the equipment rack with the interconnect device mounted at the rear of the equipment rack on a separate set of mounting rails. This interconnect device was easier to connect to because of the interconnect style and also because it was easily accessible relative to the installer and the incoming signals/wire trunks. Soon manufacturers were wiring panels of jacks at a factory to any of several popular interconnect devices. This saved the end-user/wirer/installer hours of installation time. The supplied units were called "pre-wired" jackfields. In North America, and many other parts of the world, this is the preferred type of jackfield product using longframe or bantam jacks. The different types of interface devices include punch-blocks, solder blocks, wire-wrap blocks, screw terminals and multi-pin connectors. Outside of North America you will find some countries still using the non pre-wired panels of jacks, and many countries in a state of conversion to pre-wired jackfields. The main resistance in many countries is the added cost of the pre-wired jackfield, or no knowledge that such an option is available. Cost is the usual deterrent as most of the world is generally aware of the pre-wired option.

The pre-wired versions are very labor intensive at the manufacturing level. A few attempts have been made to eliminate the wires between the jacks and the interconnect device by replacing the wires with a printed circuit board (PCB). The difficulties are: all the jacks soldered into one PCB makes the unit unserviceable, it is basically impossible to replace the jacks, it is also impossible to meet density requirements at the jack panel for standard jack spacing requirement, and the jack contacts on some versions take up too much space on the PCB. There is not enough room for normalling and interconnect traces, nor for mounting the customer interface modules on the far side of the PCB.

Jackfield modules comprising a housing having therein a linear array of juxtaposed channels or jacks are known from, for example, U.S. Pat. No. 4,874,317 (Lau) and U.S. Pat. No. 4,770,639 (Lau). The individual jacks are arranged on a board, which is held within the housing. The jacks have substantially cylindrical insertion collars, for receiving the plugs. The collars are arranged on a faceplate of the housing, the faceplate being common to the jacks of the module only. The individual contacts of the jack are led out at the rear of the module, opposite the faceplate. These individual contacts are to be plugged into a special printed circuit board sub-assembly (PCB), on which the actual termination of the output/input contacts of the jacks is decided. The PCB has a female contact strip on one side, arranged to receive the contacts of a jackfield module. The female contact strip is positioned so that the longitudinal planes of the module and the PCB are substantially parallel when the module contacts are inserted into the female contact strip. On the opposite side of the PCB from the female contact strip, terminal lugs are arranged. The terminal lugs are connected to the signal source/output which is intended to be used with the jackfield. The module/PCB arrangement of these documents is highly specialized and non-standard in configuration, and is thus prohibitively expensive for certain uses. The sideways mounting of PCB and connector makes the module take up a certain space in the sideways direction (the thickness direction of the module housing). Compared to a standard jack, this sideways space requirement is greater, making it difficult to pack these modules to the packing densities desired in the industry. Furthermore, the module/PCB arrangement apparently lacks the robustness required for punch termination of wires, which could easily be repeated a multitude of times during the expected lifetime of the equipment. Also, the added surface resistance in the female contact strip will possibly deteriorate the signal quality, compared to a soldered, wire-wrapped or punch terminated connection.

SUMMARY OF THE INVENTION

It is an object of the invention to provide a jackfield and jackfield modules, which mitigates the above mentioned disadvantages and provides a jackfield which has jack modules which can be programmed for normalling or chosen for a preset normalling configuration. Further, the jackfield modules are easily replaceable, without removing the entire jackfield from its rack (or similar mounting means).

In the invention, an assembly comprising two or more communication jacks, having wire-wrap terminal connectors, and a printed circuit board fastened to the terminal connectors and arranged in a gap formed between the terminal connectors, is used as a jackfield module. The board has an electrically conducting pattern arranged on both flat sides of the board, the pattern comprising a set of input pads, electrically connectable to the terminal conductors, a set of output pads, for connecting to electrical wiring, and interconnecting means for electrically connecting an individual input pad of the input pads to an individual output pad of the output pads.

In a first embodiment, the interconnecting means comprises wire bridges. The wire bridges may be soldered between one desired input pad and one desired output pad.

In a second embodiment, the interconnecting means comprises multiple mechanical switches, for closing or opening electrical connection between desired input pad and desired output pad. The switches are, for example, single-throw switches or double-throw switches.

In a third embodiment, the interconnecting means comprises electrically conductive patterns on the printed circuit board.

Thus, a communication jackfield, according to the invention, preferably comprises a face-plate, having a multitude of first through holes, a multitude of assemblies comprising two or more communication jacks, having wire-wrap terminal connectors. A printed circuit board is fastened to the terminal connectors and arranged in a gap formed between the terminal connectors, making the combination of jacks and printed circuit board a jackfield module. The board has an electrically conducting pattern arranged on both flat sides of the board, the pattern comprising a set of input pads, electrically connectable to the terminal conductors, a set of output pads, for connecting to electrical wiring, and interconnecting means for electrically connecting an individual input pad of the input pads to an individual output pad of the output pads. The assemblies are arranged to be mounted in the first through holes of the face-plate.

The programmable, high density jackfield according to the invention addresses all of the issues above in one package, while maintaining the use of the traditional and universally accepted longframe and bantam jacks.

A preferred embodiment of programmable, high density jackfield modules comprises a series of modules forming a product family. Preferably, the product families comprise the following jack modules:

1. Bantam jack modules in one rack unit with various interface types.
2. Bantam jack modules in two rack units with various interface types.
3. Longframe jack modules in one rack unit with various interface types.
4. Longframe jack modules in two rack unit with various interface types.

These modules do not have programmable normals, because of the cost of the programmable feature, this embodiment of the invention offers interchangeable modules, each module with a dedicated normal configuration achieved by traces on the PCB. Therefore modules are needed for full normals, half normals and no normals (thus, there are three different modules). The flexible grounding features will apply to all modules and arrays of modules.

All of the module to panel mounting screws will be accessible from the front of the panel through access holes, thus module replacement is easier than for modules or jacks having rear mount screws. The user keeps a supply of modules and interchanges them as required. The modules will be color coded and indication means, for example colored plastic buttons, will be provided to be inserted onto the front of the panel, to indicate the type of circuit for that module position. Thus, the front mount modules makes module replacement very easy.

In order to accomplish the required front access screw holes, a special designation/labeling strip has been developed. The design of the strip maximizes the label size for the customer labeling by allowing the strip to be placed against the edge of the jack, without interfering with a patchcord plug. The design of the strip also makes alignment and assembly of the strip to the panel very quick, without the use of screws. Rather than being a single strip as is industry standard, it is a full face extrusion, that affords separate strips above and below the two rows of jacks. It also acts as a retainer for the color-coding plastic buttons and also as a place to silkscreen jack position numbers. The designation holds the mounting screws captive, yet another feature provided by this strip.

A further embodiment of the inventions has programmable versions of the above described modules.

Furthermore, a strain relief may be incorporated on each module. This is a feature which allows the customer to thread his wires through a holder, to help organize wires and also to add strain relief for the customer wired connections to the module. This strain relief is, for example, a formed wire spring or a metal stamping. A plastic or aluminium extrusion is an alternative. Making strain relief a part of each module is consistent with making each module easily removable/replaceable.

Still a further embodiment of the invention incorporates backlit designations on the jackfield panel. On traditional jackfields, labels get changed from time to time and they are generally 17 to 17.5" in length. The handling of these labels is difficult, the labels are prone to being folded when inserted and ripping when removed.

The individual jacks used to the invention have the following advantages: A robust die cast or stamped metal frame and heavy duty nickel steel contact and switching springs, making the jacks very robust and durable for a long life.

The frame can have different configurations of contact and switching springs separated by insulating wafers either fabricated or molded.

The contact springs are stamped so that a section of the stamping protrudes out the rear of the jack. These protrusions are designed to have wires wire-wrapped or designed to have wires soldered to them. The physical layout of these protrusions varies from manufacturer to manufacturer as this layout is non-critical to conventional use. For the invention, the protrusion style chosen, but not limited to, is wire-wrap. The invention will work with solder type protrusions, but the wire-wrap better fits the application. The jacks have two rows of protrusions, thus forming a space between the two rows. The invention specifies a space at 0.093" so that an 0.093 PCB can slide edgewise in between the protrusions. All protrusions make contact with the PCB over the full length of the protrusion. The 0.093" was chosen for board strength and because one jack suppliers jack which is currently commonly used, will adapt immediately to the invention. This jack was never intended for this use by the manufacturer. Other jacks will possibly have to be custom manufactured to this 0.093 specification.

The jacks mount in vertical pairs onto the edge of the PCB. The invention allows ample room for traces to connect the two jacks in a variety of configurations. The invention also allows ample room for traces to connect the jacks to rear edge-mount interconnect devices.

The vertical cards will have plated through holes or slots, or solder pads to accommodate different types of grounding layouts. This will accommodate many variations of grounding layout that some customers require. The most common requirement is floating grounds, which is the default configuration.

BRIEF DESCRIPTION OF THE DRAWINGS

In order that the invention may be more clearly understood, the preferred embodiment thereof will now be described in detail by way of example, with reference to the accompanying drawings, in which.

DETAILED DESCRIPTION OF THE INVENTION

Figure 1:
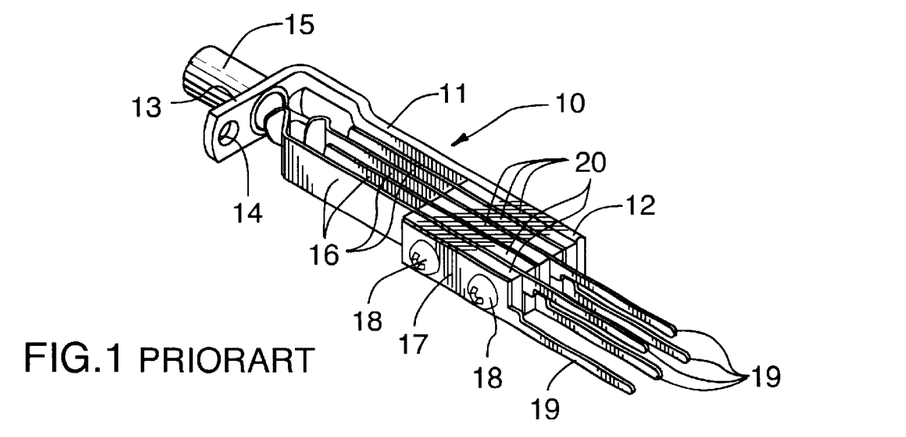
FIG. 1 is a schematic elevational side view of a standard wire-wrap jack according to prior art.
Figure 2:
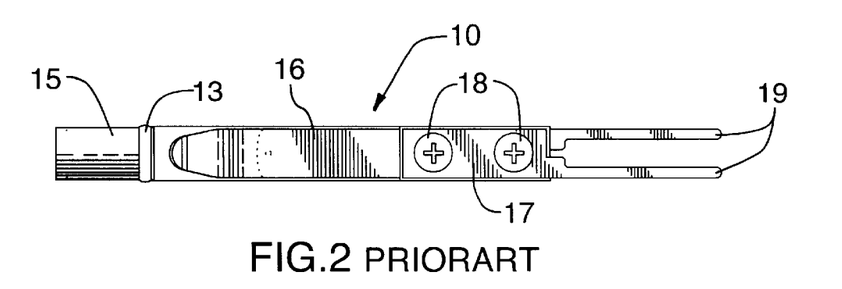
FIG. 2 is a schematic side view of the jack according to FIG. 1, showing the gap between the wire-wrap terminals.
Figure 3:
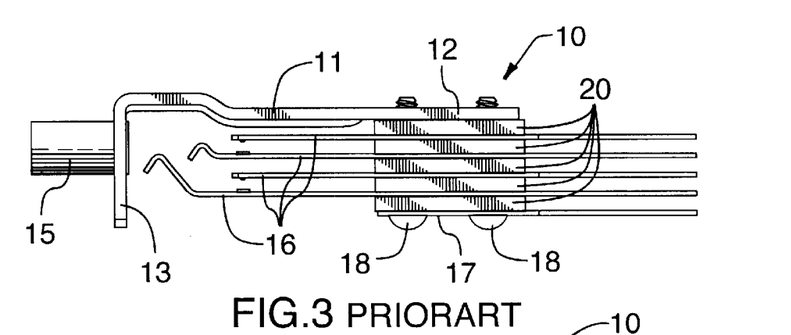
FIG. 3 is a further schematic side view of the jack according to FIG. 1, showing the contact members of the jack in profile.
Figure 4:
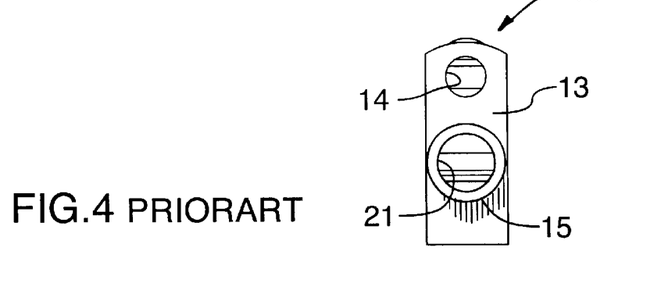
FIG. 4 is a schematic frontal view of the jack according to FIG. 1, showing the jack plug insertion collar.
Figure 5:
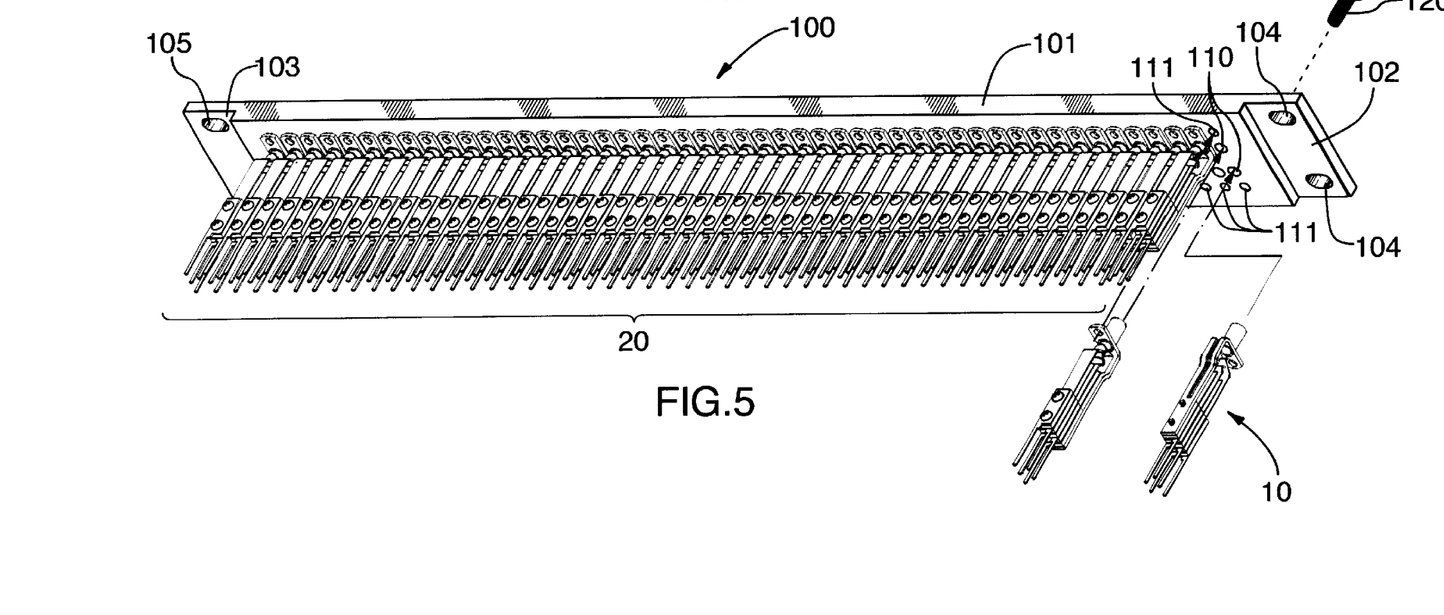
FIG. 5 is a schematic elevational side view of the rear of a jackfield according to the invention.

FIGS. 1 to 4 show a jack 10 according to the prior art. The type shown is a bantam jack, with the only important difference between a bantam and a longframe jack being the relative sizes. The jack has a frame 11, which at a first end 12 has fastening means 18 for a plurality of contact elements 16. The contact elements are electrically insulated from each other by insulating pads 20. The frame further has a second end 13, which has a bent portion onto which a sleeve 15 is mounted. The second end has a mounting hole 14, for mounting the jack 10 to a panel, or similar. Traditionally, the mounting hole has been used to receive a screw inserted from the side of the mounting hole which faces the first end of the frame. The screw then is screwed into the material of the face plate. Thus, the jacks have been mounted and fastened from behind the panel. In the present invention, the mounting hole 14 has threads, allowing the jack to be mounted from the back of the panel, but fastened from the front using a screw inserted via a first through hole 111 (see FIGS. 5, 6 and 16) of the panel and cooperating with the threads. In FIG. 5, the PCBs have been omitted for clarity, see FIG. 16 for an example of how the PCB mounted jacks are inserted into the face plate. Thus, in FIG. 5 is only shown the relative position of the jacks, when mounted as one row of jacks on the face plate. In actual use, the jacks would first be mounted onto the PCBs and then mounted to the face plate.

The contact elements 16 have particular shapes to either make or break electric connections between specific contact elements as a jack plug (not shown) is inserted into the sleeve 15 and pressed into click-stop engagement with certain contact elements, as is already known in the art. The jack plug ground connection is carried via a contact surface 21 arranged on the inside of sleeve 15, through the frame 11, the fastening means 18 to a ground contact element 17. All the contact elements 16, 17 have contact terminals 19 arranged at an end protruding from the first end 12 of the frame 11. The contact terminals are, in this embodiment of a known jack, intended to receive electric wire connections via wire-wrapping.

Figure 6:
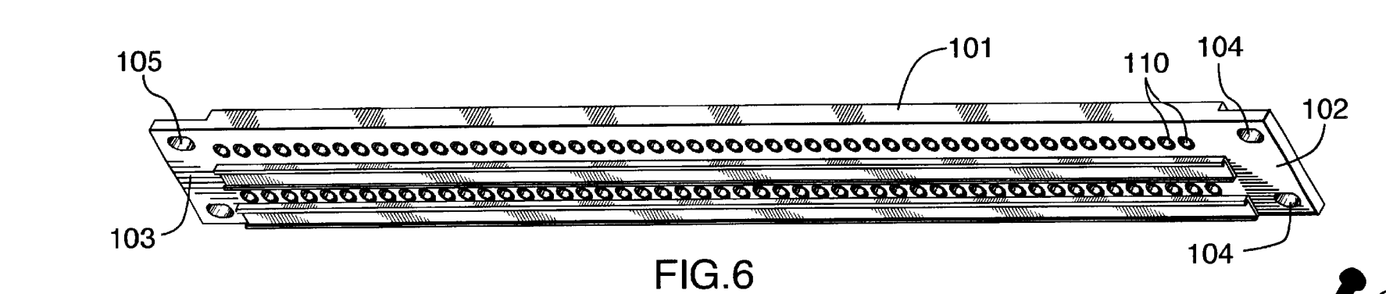
FIG. 6 is a schematic elevational side view of the front of a jackfield according to the invention.
Figure 16:
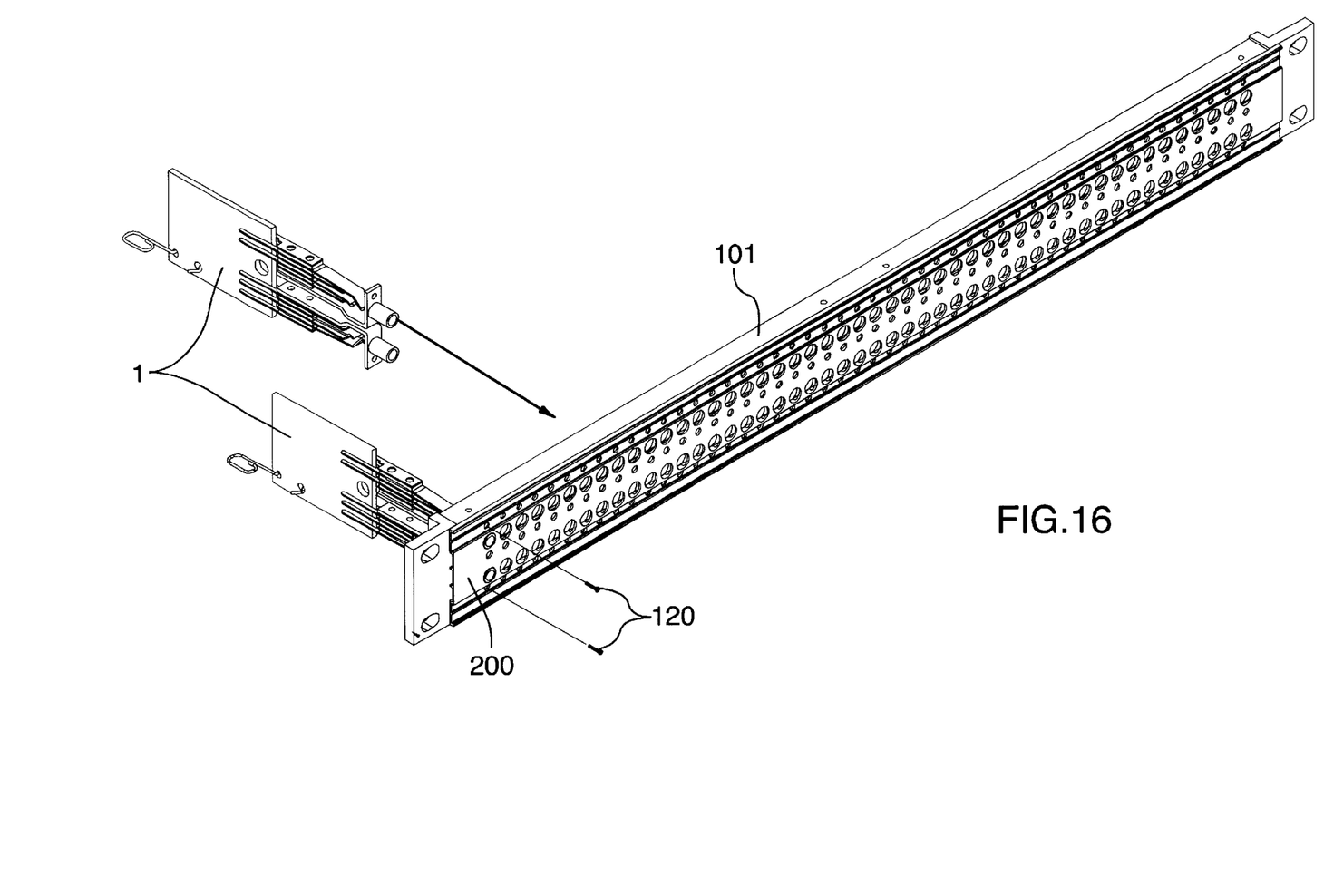
FIG. 16 is a schematic elevational side view of a jackfield face plate having a designation plate mounted, showing one installed jackfield module awaiting to be fastened, by screws and another jackfield module positioned for installation.

The jacks 10, assembled into jackfield modules 1, as will be described later, are preferably arranged in jackfields 100 on a face plate 101, as shown in FIGS. 5, 6 and 16. The face plate preferably has a first mounting end 102 and a second mounting end 103, and the first mounting end has first mounting means 104 and the second mounting end has second mounting means 105. The first and second mounting ends are preferably arranged to be mounted to a standard rack construction (not shown), using the first and second mounting means. The first and second mounting means are preferably through holes corresponding to mounting holes in the rack construction. A plurality of jacks 10, in pairs as jackfield modules 1, are inserted into second through holes 110 arranged in the face plate 101, so that the front end of the sleeve 15 is substantially flush with the outer surface of the face plate. Each jack is then fastened to the face plate via a screw 120, which is inserted from the front of the face plate through a screw hole 111, and threaded into the mounting hole 14, as described above. Thus, two rows 20 of jacks are formed, an upper row and a lower row, comprising a plurality of paired jacks.

FIGS. 12 to 15 show a jackfield module 1 according to the invention. A PCB 50 of substantially rectangular shape is arranged to be conductively fastened to the terminals 19 of a pair of jacks 10, 10'. The terminals are preferably soldered to the PCB. Advantageously, a connection cable relief means 90 is arranged on the PCB, the cable relief preferably comprising a wire loop element attached to relief means fastening holes 91 on the PCB. A plurality of these modules 1 are attachable to the face-plate of a jackfield, as described above, after the PCB has been fastened to the jacks.

Figure 7:
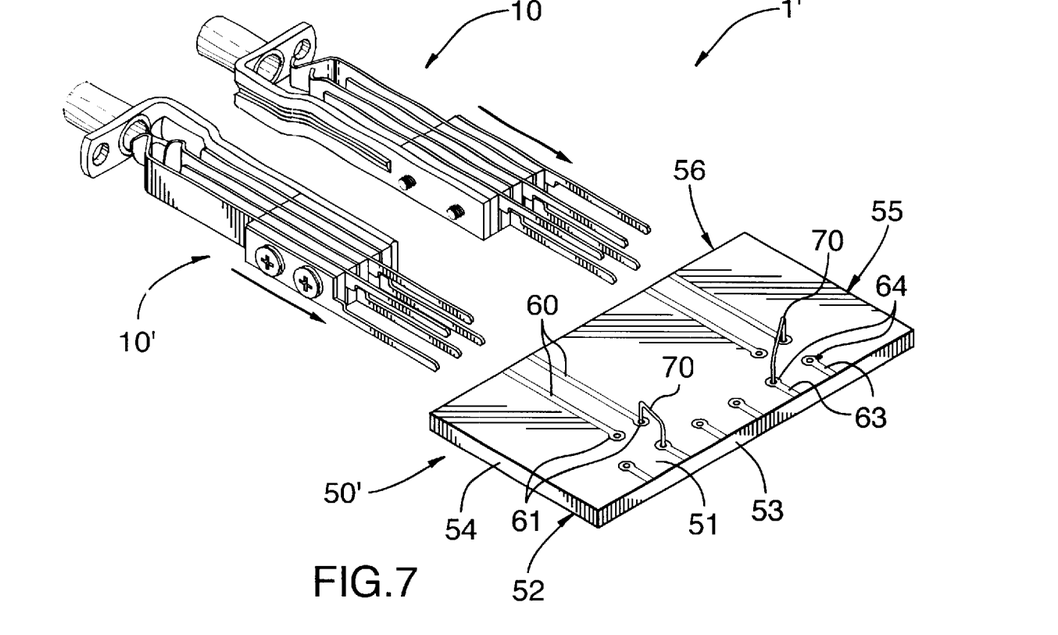
FIG. 7 is a schematic elevational side view of a first embodiment of a printed circuit board and its connection to a pair of jacks, according to the invention.
Figure 8:
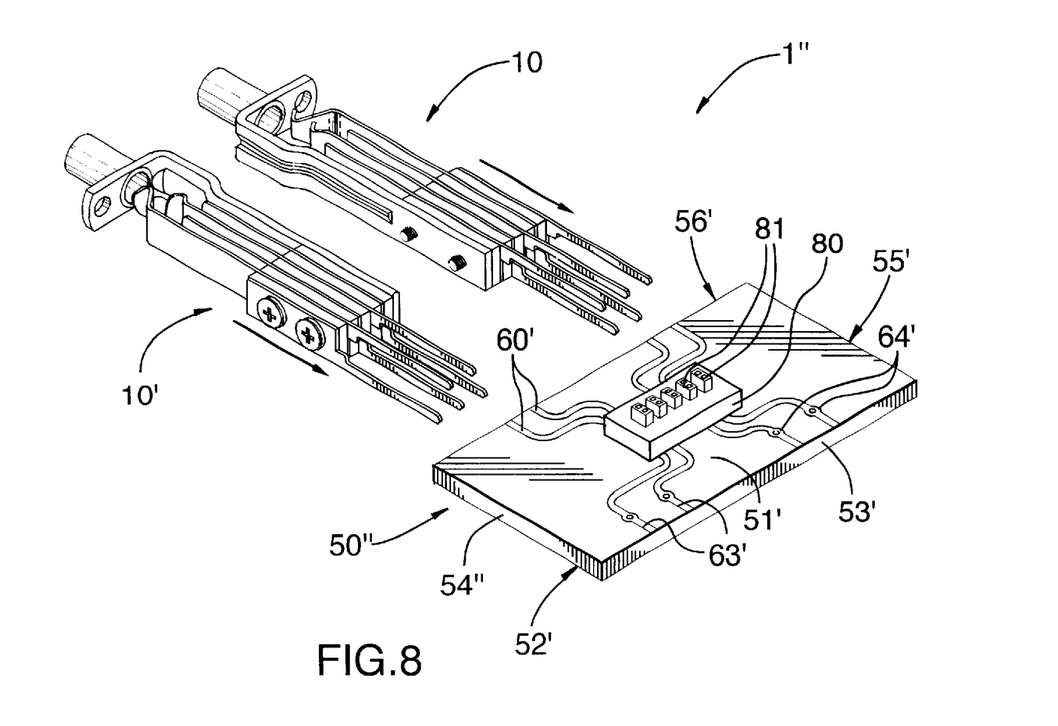
FIG. 8 is a schematic elevational side view of a second embodiment of a printed circuit board and its connection to a pair of jacks, according to the invention.
Figure 9:
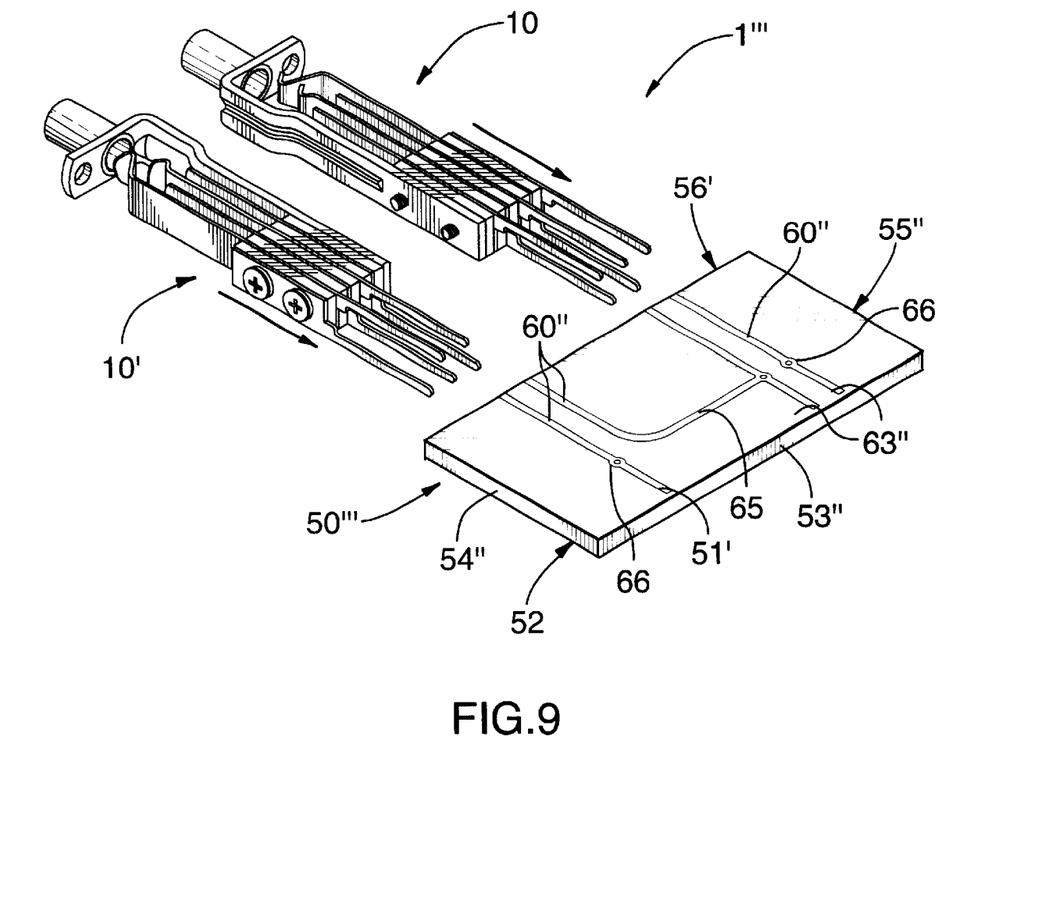
FIG. 9 is a schematic elevational side view of a third embodiment of a printed circuit board and its connection to a pair of jacks, according to the invention.

According to the invention, each pair of jacks 10, 10'is connected via a printed circuit board 50, 50', 50", as shown in FIGS. 7 to 9. The PCBs are shown in three configurations: FIG. 7, FIG. 8 and FIG. 9.

FIG. 7 shows a first embodiment of a PCB 50', for use in a jackfield module assembly 1' according to the invention. The PCB has a substantially rectangular shape, having a first long edge 53, a second long edge 56, a first short edge 54 and a second short edge 55. A first surface 51 and a second surface 52 of the first PCB have printed circuit patterns arranged on them. The printed circuit pattern preferably comprises contact terminal connection strips 60, arranged adjacent and substantially perpendicularto the second long edge, onto which strips the contact terminals 19 of the jacks 10, 10' are electrically conductively bondable, by soldering, for example. The contact terminal connection strips 60 have first jumper pads 61, for electrically conductively receiving jumper cables 70. Each first jumper pad has a through hole 62, which is electrically connected to a jumper pad arranged on the opposite surface of the first and second surfaces of the first embodiment PCB. The printed circuit pattern further preferably comprises lead-out connections 63, arranged adjacent the first long edge 53, the lead-out connections having second jumper pads 64, for electrically conductively receiving the jumper cables 70. Each second jumper pad has a through hole 65, which preferably is plated, to allow bonding (for example by soldering) of the jumper cable. Thus, a single jumper cable can connect one first jumper pad 61 and one second jumper pad 64. The jumper cables may be arranged on one or both sides of the first PCB, preferably all jumper connections are made on one side. In this way, depending upon the printed circuit pattern, the signal from each contact terminal 19 can be led to an arbitrary lead-out connection 63. Each lead-out connection is, in turn, electrically connected to a signal wire connector (not shown). Examples of signal wire connectors are punch terminals, solder ears, wire wrap terminals and screw terminals.

FIG. 8 shows a second embodiment of a PCB 50", for use in a further jackfield assembly 1" according to the invention. The PCB has a substantially rectangular shape, having a first long edge 53', a second long edge 56', a first short edge 54' and a second short edge 55'. A first surface 51' and a second surface 52' of the second PCB have printed circuit patterns arranged on them. The printed circuit pattern preferably comprises contact terminal connection strips 60', arranged adjacent and substantially perpendicular to the second long edge 56', onto which strips the contact terminals 19 of the jacks 10, 10' are electrically conductively bondable, by soldering, for example. The contact terminal connection strips 60 lead to a pattern (not shown) for soldering either separate electrical switches (not shown), a jumper block (not shown) or, alternatively, a so called DIP-switch assembly 80 onto the second PCB. The type of switching mechanism chosen depends on the projected lifespan, accessibility, intended use and maximum cost of the whole jackfield and module assembly. The DIP-switch assembly has individual switches 81. The printed circuit pattern further preferably comprises lead-out connections 63', arranged adjacent the first long edge 53', the lead-out connections having second jumper pads 64' with through holes 65' for alternatively soldering. Each lead-out connection is, in turn, electrically connected to a signal wire connector (not shown), either via the lead-out connections 63' or via the second jumper pads 64'. Examples of signal wire connectors are punch terminals, solder ears, wire wrap terminals, screw terminals and wires soldered in to the second jumper pads.

FIG. 9 shows a third embodiment of a PCB 50''', for use in still a further jackfield module assembly 1''' according to the invention. The PCB has a substantially rectangular shape, having a first long edge 53", a second long edge 56", a first short edge 54" and a second short edge 55". A first surface 51" and a second surface 52" of the third PCB have printed circuit patterns arranged on them. The printed circuit pattern preferably comprises contact terminal connection strips 60", arranged adjacent and substantially perpendicular to the second long edge, onto which strips the contact terminals 19 of the jacks 10, 10' are electrically conductively bondable, by soldering, for example. The contact terminal connection strips 60" have third jumper pads 66, with third through holes 65", for electrically conductively connecting selected circuit patterns of one surface of the third PCB 50" with the other surface of the third PCB. The printed circuit pattern further preferably comprises lead-out connections 63", arranged adjacent the first long edge 53". In this way, depending upon the printed circuit pattern, the signal from each contact terminal 19 can be led to an arbitrary lead-out connection 63, using a set normalling pattern in this case, i.e. the connections are decided by the pre-printed circuit patter. Each lead-out connection is, in turn, electrically connected to a signal wire connector (not shown). Examples of signal wire connectors are punch terminals, solder ears, wire wrap terminals and screw terminals.

Alternatively, combinations of the above described particular embodiments are also possible. For example, a PCB having a mixture two or more of pre-set normalling, jumper set normalling and switchable normalling is possible. The grounding is advantageously done by soldering a wire between the individual PCBs, using either terminals connected to the desired circuit pattern on the PCB or pre-drilled holes in the PCB. The holes are surrounded by a circuit pattern connecting to the desired jack contact(s), and the wire is routed through the hole and soldered in place. Advantageously, the grounding holes of each individual PCB substantially aligns with the hole of its neighbouring PCBs, thus facilitating threading the wire through the holes.

Advantageously, any interfacing is performed either directly to the PCBs, or to an interface module (not shown) attachable to the rear of the jackfield modules. The interface modules may then be of a type specifically requested or necessitated by the application. Any wire connections are then made onto the interface module, for instance by an end user of the jackfield.

Figure 10:
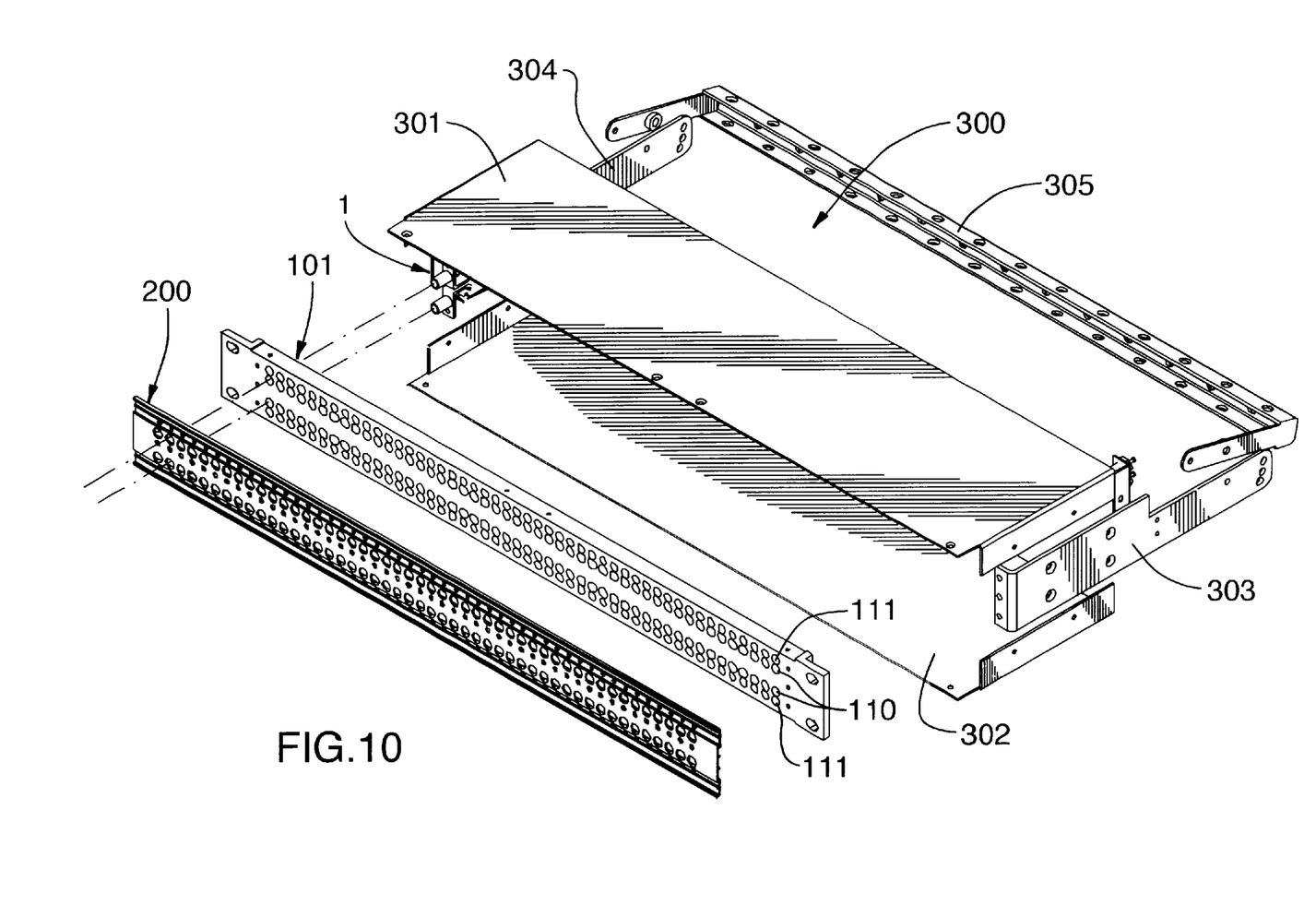
FIG. 10 is an exploded schematic elevational side view of a jackfield according to the invention.
Figure 11:
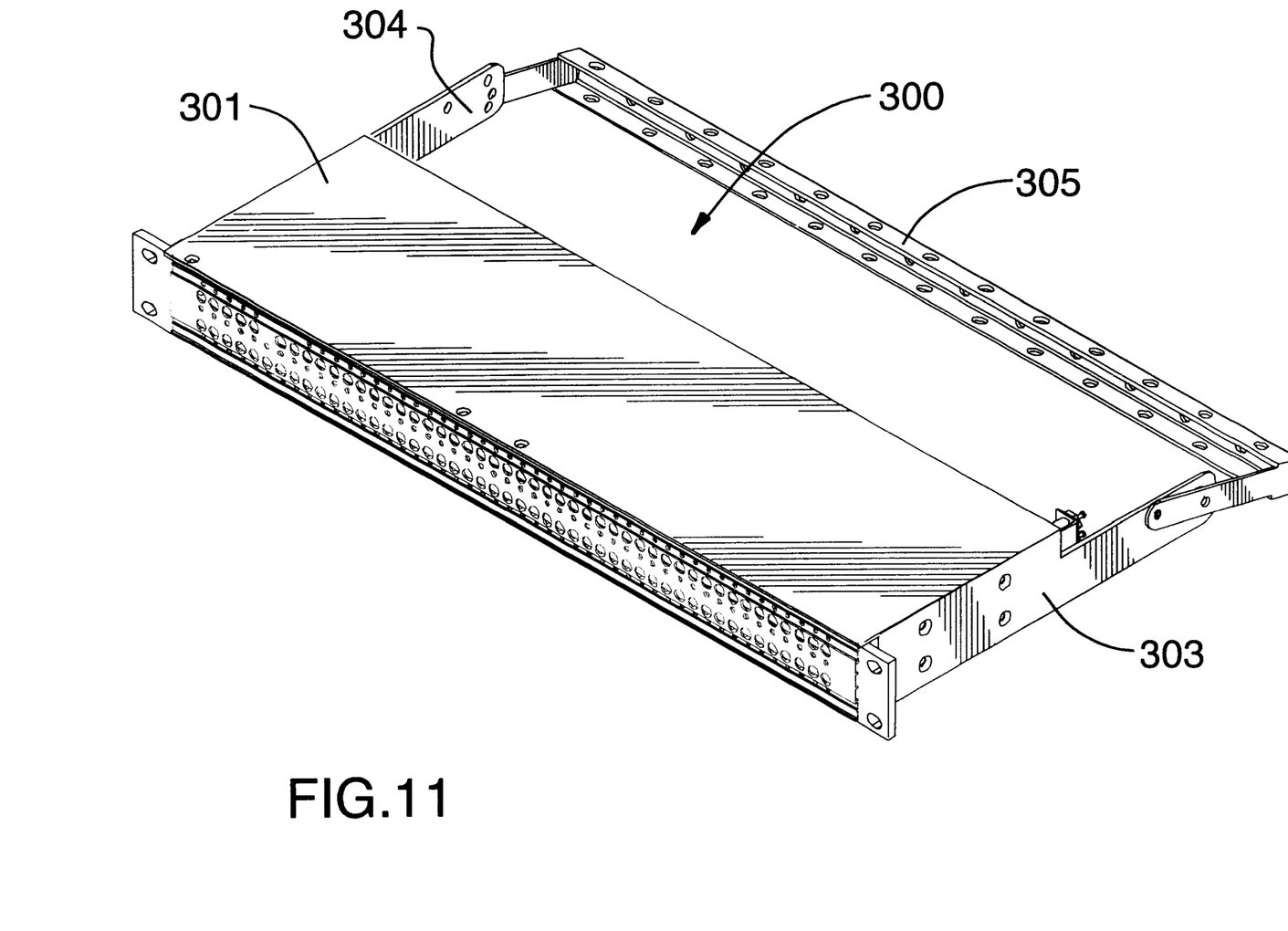
FIG. 11 is a schematic elevational side view of an assembled jackfield according to the invention, showing one installed jackfield module.
Figure 12:
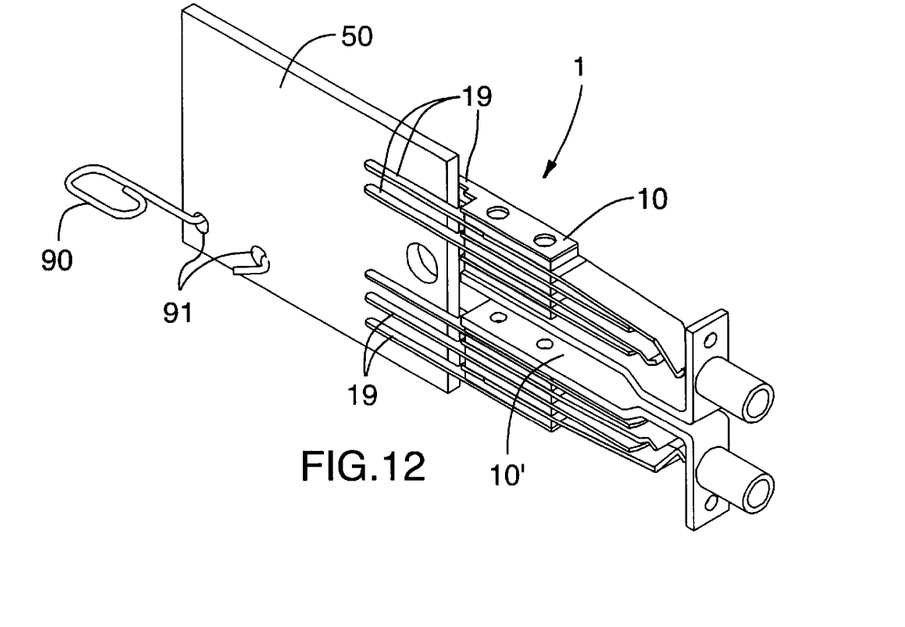
FIG. 12 is a schematic elevational side view of a jackfield module according to the invention.
Figure 13:
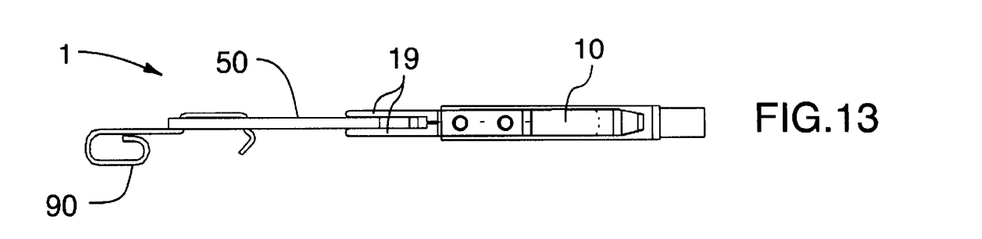
FIG. 13 is a top view of a jackfield module according to FIG. 12, is a schematic side view of a jackfield module according to FIG. 12.
Figure 14:
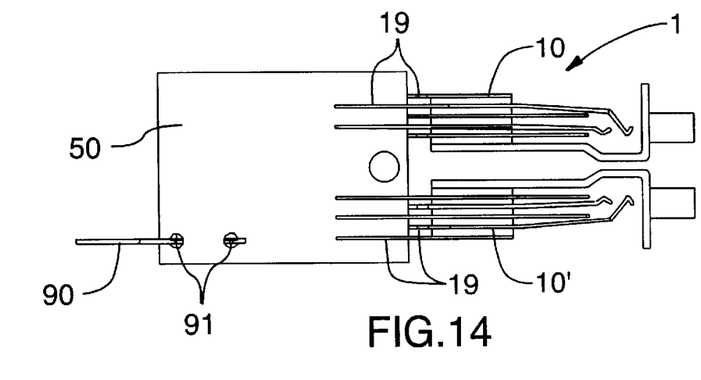
FIG. 14 is a schematic front view of a jackfield module according to FIG. 12.
Figure 15:
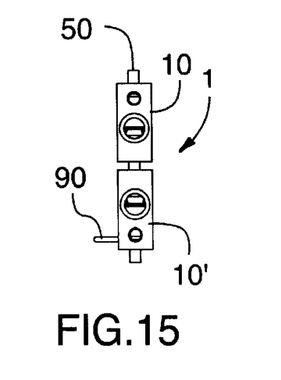
FIG. 15 is a schematic front view of a jackfield module according to FIG. 12.

A complete jackfield, with one jackfield module 1 installed, is shown in FIGS. 10 and 11. The jackfield has the face plate 101, a designation plate 200, for attaching markings, and an enclosure structure 300. The enclosure preferably has a top 301, a bottom 302, a first side piece 303 and a second side piece 304. Advantageously, a wire routing structure 305 is attachable to the rear of the jackfield. The assembled jackfield, as shown in FIG. 11, is preferably mounted in a rack structure (not shown), optionally together with other jackfields.

Figure 17:
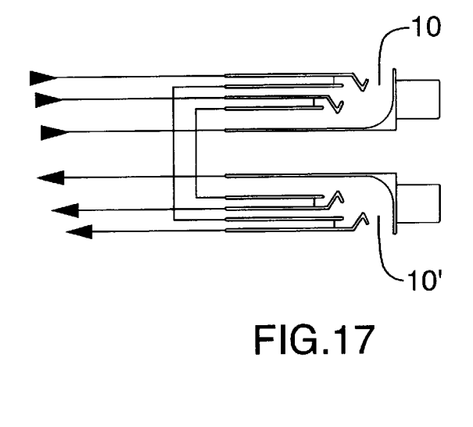
FIG. 17 is a schematic view of a full normals jackfield module connection.
Figure 18:
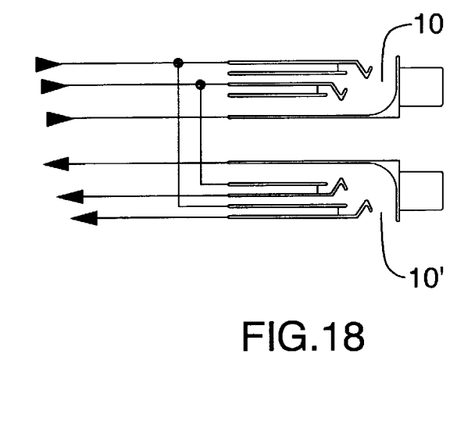
FIG. 18 is a schematic view of a half normals jackfield module connection.
Figure 19:
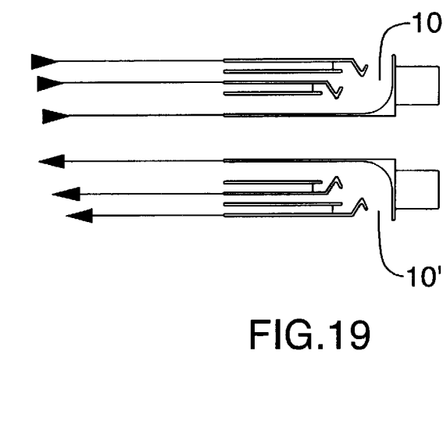
FIG. 19 is a schematic view of a no normals jackfield module connection.

The normalling options traditionally used in the industry are illustrated in FIGS. 17 to 19. FIG. 17 shows the jackfield module connections onboard the PCB for Full Normals, between a first jack 10 and a second jack 10' of the module. FIG. 18 shows the jackfield module connections onboard the PCB for Half Normals. FIG. 19 shows the jackfield module connections onboard the PCB for No Normals.

A further alternative embodiment employs programmable electronic circuits, to perform any normalling or grounding of the jack terminals to the output terminals of the PCBs. Such programmable electronic circuits may be remotely programmable or programmable via temporary plug-in leads or may comprise pre-programmed modules which are either soldered onto the PCB or inserted into a socket previously soldered to the PCB.

Thus, a panel system for communication jacks according to the present invention has many advantages. Some of them are described in the following, with reference to the different types of jacks.

BANTAM

Single vertical PCB, in-line, for each vertical jack pair:
  a. Density
  Meets 0.312" (7.93 mm) density requirement. Because the jack straddles the PCB, no excess width is created.
  b. Structural Integrity
  The PCB is 0.093" (2.36 mm) thick and provides excellent strength in all planes for any application. The jacks rear terminals are soldered along their full length giving many times the strength of 90 degree PCB mounting or in-line bent terminals mounting. Rear interfaces are edge soldered to maximize strength in the plane required.
  c. Serviceability
  Good serviceability.
  d. Assembly
  Easy assembly.
  e. Labor Content
  Greatly improved over prior art.
  f. Normalling Options
  Each card has an edge-mounted female header, and is supplied with jumpers/switches/fixed normalling pattern. Any normalling configuration can be programmed by the user, except for the fixed normalling option.
  g. Grounding Options
  The same header can be programmed for different grounding options. This makes this the only product available with programmable grounding and normalling options.

It will be appreciated that the above description relates to the preferred embodiments by way of example only. Many variations on the invention will be obvious to those knowledgeable in the field, and such obvious variations are within the scope of the invention as described and claimed, whether or not expressly described.

What is claimed is:

1. An assembly comprising:
   two or more standard communication jacks, each said jack having a frame, which at a first end has fastening means for a plurality of contact elements, said contact elements being electrically insulated from each other by insulating pads, said frame further having a second end, which has a bent portion onto which a sleeve is mounted, said second end having a mounting hole, for mounting said jack, said jack further having wire-wrap terminal connectors;
   a printed circuit board fastened to said terminal connectors, arranged in a gap formed between said terminal connectors and held solely by said terminal connectors, said board having an electrically conducting pattern arranged on both flat sides of said board, said pattern comprising a set of input pads, electrically connected to said terminal conductors, a set of output pads for connecting to electrical wiring, and interconnecting means for electrically connecting an individual input pad of said input pads to an individual output pad of said output pads.

2. An assembly according to claim 1, wherein said interconnecting means comprises wire bridges.

3. An assembly according to claim 2, wherein said wire bridges are soldered between one desired said input pad and one desired said output pad.

4. An assembly according to claim 1, wherein said interconnecting means comprises multiple mechanical switches, for closing or opening electrical connection between desired said input pad and desired said output pad.

5. An assembly according to claim 4, wherein said switches are single-throw switches.

6. A device according to claim 4, wherein said switches are double-throw switches.

7. A device according to claim 1, wherein said interconnecting means comprises electrically conductive patterns on said printed circuit board.

8. A communication jackfield comprising:
   a face-plate, having a multitude of first through holes;
   a multitude of assemblies comprising two or more standard communication jacks, each said jack having a frame which at first end has fastening means for a plurality of contact elements, said contact elements being electrically insulated from each other by insulating pads, said frame further having a second end, which has a bent portion onto which a sleeve is mounted, said second end having a mounting hole, for mounting said jack, said jack further having wire-wrap terminal connectors;

a printed circuit board fastened to said terminal connectors, arranged in a gap formed between said terminal connectors and held solely by said terminal connectors, said board having an electrically conducting pattern arranged on both flat sides of said board, said pattern comprising a set of input pads, electrically connected to said terminal conductors, a set of output pads for connecting to electrical wiring, and interconnecting means for electrically connecting an individual input pad of said input pads to an individual output pad of said output pads;

the assemblies being arranged to be mounted in said first through holes of said face-plate and said mounting hole having threads, allowing said jack to be mounted from a back of said face-plate, but fastened from a front of said face-plate using a screw inserted via a first through hole of said face-plate.

9. A communication jackfield according to claim 8, wherein said interconnecting means comprises wire bridges.

10. An assembly according to claim 9, wherein said wire bridges are soldered between one desired said input pad and one desired said output pad.

11. An assembly according to claim 8, wherein said interconnecting means comprises multiple mechanical switches, for closing or opening electrical connection between desired said input pad and desired said output pad.

12. An assembly according to claim 11, wherein said switches are single-throw switches.

13. A device according to claim 11, wherein said switches are double-throw switches.

14. A device according to claim 8, wherein said interconnecting means comprises electrically conductive patterns on said printed circuit board.

* * * * *